United States Patent
Chiang et al.

(10) Patent No.: US 11,408,730 B2
(45) Date of Patent: Aug. 9, 2022

(54) STRESS MEASURING DEVICE AND STRESS MEASURING METHOD

(71) Applicant: Industrial Technology Research Institute, Hsinchu (TW)

(72) Inventors: I-Hung Chiang, Changhua County (TW); Hung-Hsien Ko, Hsinchu County (TW); Cheng-Ta Pan, Kaohsiung (TW); Wen-Yung Yeh, Hsinchu County (TW); Cheng-Chung Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 336 days.

(21) Appl. No.: 16/688,993

(22) Filed: Nov. 19, 2019

(65) Prior Publication Data

US 2020/0158493 A1   May 21, 2020

Related U.S. Application Data

(60) Provisional application No. 62/770,138, filed on Nov. 20, 2018.

(30) Foreign Application Priority Data

Nov. 6, 2019   (TW) .................................. 108140236

(51) Int. Cl.
*G01B 11/16* (2006.01)
*G01N 3/24* (2006.01)
*G01L 1/24* (2006.01)

(52) U.S. Cl.
CPC ............... *G01B 11/16* (2013.01); *G01L 1/24* (2013.01); *G01N 3/24* (2013.01); *G01N 2203/0025* (2013.01)

(58) Field of Classification Search
CPC . G01B 11/16; G01L 1/24; G01N 3/24; G01N 2203/0025; G01N 2203/0214
(Continued)

(56) References Cited

U.S. PATENT DOCUMENTS 4,070,683 A * 1/1978 Altschuler ......... G01B 11/2513
356/2
4,969,106 A * 11/1990 Vogel .................. G01B 11/165
382/108
(Continued)

FOREIGN PATENT DOCUMENTS

CN    105091769    11/2015
TW    200928331    7/2009
(Continued)

OTHER PUBLICATIONS

"Office Action of Taiwan Counterpart Application", dated May 20, 2020, p. 1-p. 4.

*Primary Examiner* — Roy M Punnoose
(74) *Attorney, Agent, or Firm* — JCIPRNET

(57) ABSTRACT

A stress measuring device and a stress measuring method for measuring a stress distribution of an object are provided. The stress measuring method includes: receiving a first-dimension image of the object; marking an area of the first-dimension image to generate a marked area; calculating a first stress applied to the marked area and transforming the marked area to a strained marked area corresponding to a second-dimension image to generate a determination result; and calculating the stress distribution corresponding to the first-dimension image of the object according to the determination result.

20 Claims, 4 Drawing Sheets

(58) Field of Classification Search
USPC .......................................................... 382/141
See application file for complete search history.

(56) References Cited

U.S. PATENT DOCUMENTS

| | | | |
|---|---|---|---|
| 5,117,255 A * | 5/1992 | Shiraishi | G03F 7/70241 355/52 |
| 6,268,903 B1 * | 7/2001 | Chiba | G02B 27/0025 355/53 |
| 7,769,550 B2 | 8/2010 | Hyodo et al. | |
| 10,209,206 B2 | 2/2019 | Barak et al. | |

FOREIGN PATENT DOCUMENTS

| | | |
|---|---|---|
| TW | I434021 | 4/2014 |
| WO | 2011065175 | 6/2011 |

\* cited by examiner

STRESS MEASURING DEVICE AND STRESS MEASURING METHOD

CROSS-REFERENCE TO RELATED APPLICATION

This application claims the priority benefits of U.S. provisional application Ser. No. 62/770,138, filed on Nov. 20, 2018, and Taiwan application serial no. 108140236, filed on Nov. 6, 2019. The entirety of each of the above-mentioned patent applications is hereby incorporated by reference herein.

BACKGROUND

Technical Field

The disclosure relates to a stress measuring technique, and also relates to a stress measuring device and a stress measuring method.

Description of Related Art

At present, when a stress distribution of an object is to be measured, it is required to first establish a three-dimensional model for the object, and then use stress simulation software to calculate a stress of the three-dimensional model, so as to generate the stress distribution of the object. However, in some cases, the stress distribution calculated by the above method does not meet a practical requirement. Taking a circuit layout of a Printed Circuit Board (PCB) as an example, when the PCB is designed, a layout engineer needs to consider a two-dimensional stress distribution of the PCB to determine how electronic components and circuits should be laid out on a plane of the PCB. However, according to the existing stress test method, the layout engineer may only obtain an overall stress distribution (i.e., a three-dimensional stress distribution) of the three-dimensional model of the PCB by operating the stress simulation software. Therefore, the work of circuit layout becomes more complicated.

SUMMARY

An embodiment of the disclosure provides a stress measuring device for measuring a stress distribution of an object. The stress measuring device includes a processor, a storage medium, and a transceiver. The transceiver receives a first-dimension image of the object. The storage medium storages a plurality of modules. The processor is coupled to the storage medium and the transceiver and accesses and executes the modules. The modules include a marking module and a calculation module. The marking module marks an area of the first-dimension image to generate a marked area. The calculation module calculates a first stress applied to the marked area and transforming the marked area to a strained marked area corresponding to a second-dimension image to generate a determination result and calculates the stress distribution corresponding to the first-dimension image of the object according to the determination result.

An embodiment of the disclosure provides a stress measuring method for measuring a stress distribution of an object. The stress measuring method includes the following steps. A first-dimension image of the object is received. An area of the first-dimension image is marked to generate a marked area. A first stress applied to the marked area and transforming the marked area to a strained marked area corresponding to a second-dimension image is calculated to generate a determination result. The stress distribution corresponding to the first-dimension image of the object is calculated according to the determination result.

Based on the above description, the stress measuring device and the stress measuring method of the embodiments of the disclosure are adapted to calculate the stress distribution of the object under different dimensions.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
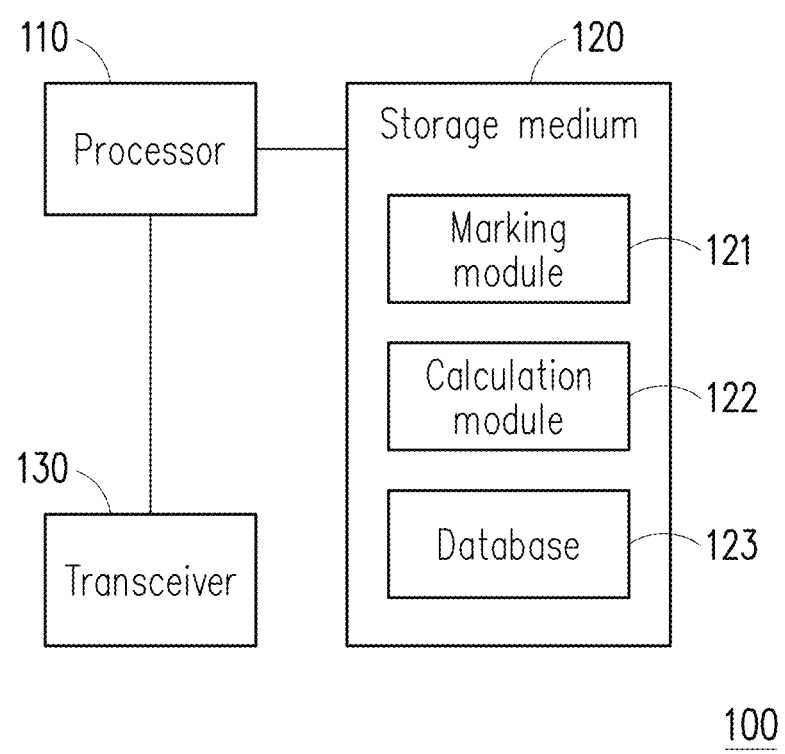
FIG. 1 is a schematic diagram of a stress measuring device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a stress measuring device 100 according to an embodiment of the disclosure, where the stress measuring device 100 is adapted to measure a stress distribution of an object. The stress measuring device 100 may include a processor 110, a storage medium 120 and a transceiver 130.

The processor 110 is, for example, a Central Processing Unit (CPU), or other programmable general purpose or special purpose Micro Control Unit (MCU), a microprocessor, a Digital Signal Processor (DSP), a programmable controller, an Application Specific Integrated Circuit (ASIC), a Graphics Processing Unit (GPU), an Arithmetic Logic Unit (ALU), a Complex Programmable Logic Device (CPLD), a Field Programmable Gate Array (FPGA) or other similar device or a combination of the above devices. The processor 110 may be coupled to the storage medium 120 and the transceiver 130, and accesses and executes a plurality of modules and various applications stored in the storage medium 120.

The storage medium 120 is, for example, any type of a fixed or movable Random Access Memory (RAM), a Read-Only Memory (ROM), a flash memory, a Hard Disk Drive (HDD), a Solid State Drive (SSD) or a similar device or a combination of the above devices, and is configured to store a plurality of modules or various applications that may be executed by the processor 110. In the embodiment, the storage medium 120 may store a marking module 121, a calculation module 122, a database 123, etc., and functions thereof are to be described later.

The transceiver 130 transmits and receives signals in a wireless or wired manner. The transceiver 130 may also perform operations such as low noise amplification, impedance matching, frequency mixing, up or down frequency conversion, filtering, amplification, and the like. The transceiver 130 is configured to receive a first-dimension image of an object, where the first-dimension image is, for example, a two-dimensional (2D) image, but the disclosure is not limited thereto. For example, when a stress distribution of an object 20 (shown in FIG. 2A) is to be calculated, a 2D image of the object 20 may be captured and transmitted to the transceiver 130 by a camera.

Figure 2A:
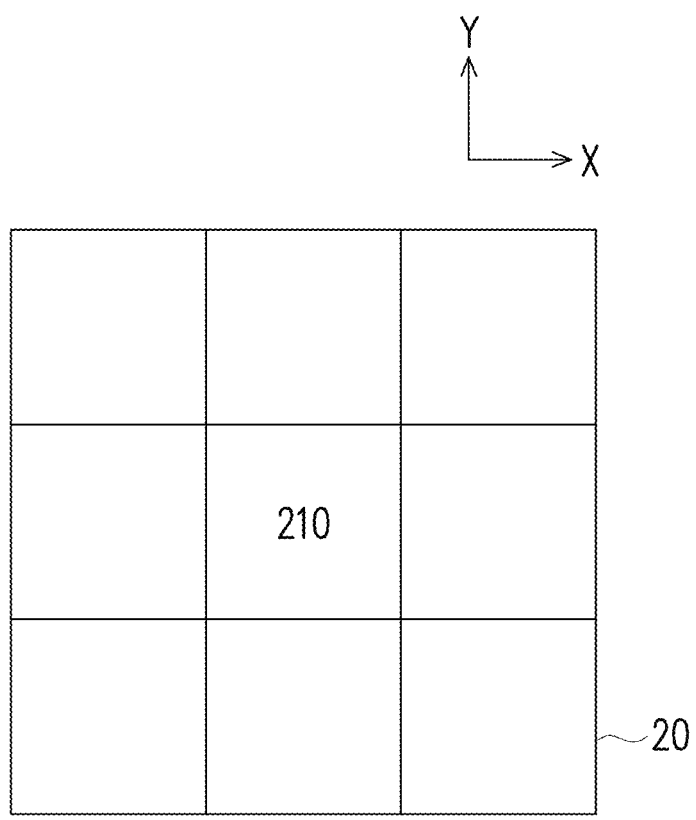
FIG. 2A is a schematic diagram of an object without being stressed according to an embodiment of the disclosure.

FIG. 2A is a schematic diagram of the object 20 without being stressed according to an embodiment of the disclosure. After obtaining the 2D image of the object 20 on an X-Y plane, the marking module 121 may mark an area of the 2D image of the object 20 to generate a marked area. Taking FIG. 2A as an example, the marking module 121 marks an area of the 2D image of the object 20 on the X-Y plane to generate nine marked areas, where the nine marked areas include a marked area 210.

Then, a user may apply a test stress on the object 20 to calculate a stress applied to each of the marked areas. For example, the user may use a tensile testing machine, etc., to apply a fixed test stress on the object 20. Alternatively, the calculation module 122 may simulate the test stress, and apply the test stress on the object 20.

Figure 2B:
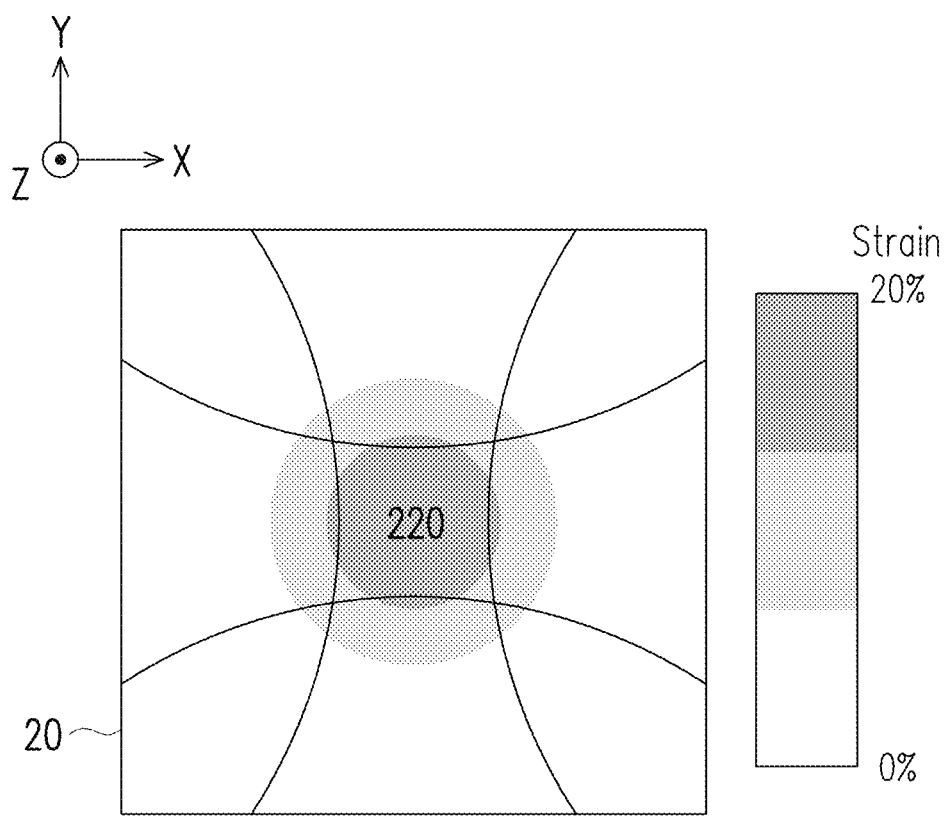
FIG. 2B is a schematic diagram of the object under a stress according to an embodiment of the disclosure.

FIG. 2B is a schematic diagram of the object 20 under a stress according to an embodiment of the disclosure. After the test stress is applied to the object 20, the 2D image of the object 20 shown in FIG. 2A is transformed into a second-dimension image shown in FIG. 2B, where the second-dimension image is, for example, a three-dimensional (3D) image of the object 20, but the disclosure is not limited thereto. Compared to the 2D image of the object 20, the 3D image of the object 20 further includes related information corresponding to a Z-axis, where the Z-axis represents a degree of strain of the object 20 after the test stress perpendicular to the X-Y plane is applied to the object 20. In other words, after the object 20 is applied with the test stress, the 2D image of the object 20 may be transformed into the 3D image including strain information of the object 20.

When the 2D image of the object 20 is transformed into the 3D image including the strain information of the object 20, a shape of the marked area 210 is changed and transformed into a strained marked area 220 corresponding to the 3D image. The calculation module 122 may measure a strain of the marked area 210 according to the marked area 210 and the strained marked area 220 after the test stress is applied to the object 20. The calculation module 122 may calculate the stress applied to the marked area 210 as a first stress according to the calculated strain and a first elastic modulus corresponding to the object 20 (or corresponding to the marked area 210) and generate a corresponding determination result, where the determination result is, for example, the stress on the object 20. For example, the calculation module 122 may draw a stress-strain curve corresponding to the object 20 according to the first elastic modulus, and derive the stress on the object 20 according to the calculated strain and the stress-strain curve.

Then, the calculation module 122 may calculate a stress distribution corresponding to the 2D image of the object 20 according to the determination result. The calculation module 122 may determine the strain of the marked area 210 after the marked area 210 is subjected to the first stress according to the marked area 210 and the strained marked area 220, thereby calculating the stress applied to the mark area 210 to be the first stress according to the strain. The calculation module 122 may determine that the first stress is applied to any point on the strained marked area 220. Based on the similar method, the calculation module 122 may calculate the stress applied to each point on the 2D image of the object 20.

For example, it is assumed that the object 20 is a PCB, a layout engineer may use the stress measuring device 100 to calculate a stress distribution of the PCB on the 2D plane through an appearance image of the PCB, thereby assisting the layout engineer to set components on the plane of the PCB.

In an embodiment, in order to quickly calculate the stress distribution of the object 20, the database 123 may pre-store a plurality of elastic moduli respectively corresponding to a plurality of different objects. The elastic moduli are, for example, calculated through calculation of the calculation module 122. For example, the calculation module 122 may receive related data corresponding to a second object through the transceiver 130, and calculate an elastic modulus corresponding to the second object according to the related data, where the related data includes a second stress applied on the second object and a strain of the second object after the second stress is applied to the second object.

When the calculation module 122 wants to calculate the stress (i.e., the first stress) applied to the marked area 210, the calculation module 122 may calculate the first stress according to the first elastic modulus in response to a measurement condition corresponding to the object 20 and the first stress matching with one of a plurality of elastic moduli (which is referred to as the first elastic modulus hereinafter). The measurement condition is associated with at least one of (but not limited to) an object shape, an object material, a stretching direction, a stretching frequency, a stretching speed, the number of times of stretching, a relaxation time, a temperature, a humidity, an air pressure, a gravity, a magnetic field distribution, or an electric field distribution, where the object material is associated with at least one of (but not limited to) a single material or a composite material, a crystalline material or an amorphous material, a molecular average isotropic material or a non-molecular average isotropic material, a material size, or a material shape.

For example, the database 123 may pre-store an elastic modulus of a cylinder (i.e., the object shape) made of copper (i.e., the object material) when it is stretched in a Y-axis direction (i.e., the stretching direction) at a temperature of 60° C. (i.e., the temperature) as the first elastic modulus. When the object 20 is a copper cylinder that is stretched in the Y-axis direction at the temperature of 60° C., the calculation module 122 may calculate the test stress applied on the object 20 according to the first elastic modulus in response to a measurement condition corresponding to the object 20 and the first stress thereof matching with the first elastic modulus, so as to calculate the first stress that transforms the marked area 210 into the strained marked area 220.

On the other hand, the database 123 may also pre-store data related to material properties of object such as a plurality of Poisson ratios or a plurality of densities, etc., respectively corresponding to a plurality of objects. The calculation module 122 may calculate the stress distribution of the object 20 more accurately based on data related to the material properties of the object. For example, the calculation module 122 may calculate the test stress applied on the object 20 according to at least one of the first elastic modulus, a first Poisson ratio or a first density in response to the object 20 matching with at least one of the first elastic modulus, the first Poisson ratio or the first density.

In an embodiment, the calculation module 122 may calculate the first stress according to a first elastic modulus matrix in response to the measurement condition matching with one of a plurality of elastic modulus matrices (which is referred to as the first elastic modulus matrix hereinafter), where the measurement condition corresponds to the first stress and the object 20, and the first elastic modulus matrix may include the aforementioned first elastic modulus. The first elastic modulus matrix may be composed of a plurality of elastic moduli respectively corresponding to different directions or different types of forces. For example, the first elastic modulus matrix may include a row of elastic modulus corresponding to a normal stress in an X-axis direction, a row of elastic modulus corresponding to a shear stress in the X-axis direction, a row of elastic modulus corresponding to a normal stress in a Y-axis direction, a row of elastic modulus corresponding to a shear stress in the Y-axis direction, a row of elastic modulus corresponding to a normal stress in a Z-axis direction and a row of elastic modulus corresponding to a shear stress in the Z-axis direction, but the disclosure is not limited thereto.

The calculation module 122 may calculate the first stress received by the marked area 210 according to the first elastic modulus matrix and the strain of the object 20, as shown by a following equation (1). The first stress may include $\sigma x$, $\sigma y$, $\sigma z$, $\tau xy$, $\tau yz$ and $\tau zx$ (but the disclosure is not limited thereto), where $\sigma x$ is the normal stress corresponding to the X-axis direction, $\sigma y$ is the normal stress corresponding to the Y-axis direction, $\sigma z$ is the normal stress corresponding to the Z-axis direction, $\tau xy$ the shear stress corresponding to the X-axis direction (the X-axis is a stress axis and the Y-axis is a shear axis), $\tau yz$ is the shear stress corresponding to the Y-axis direction (the Y-axis is the stress axis and the Z-axis is the shear axis), $\tau zx$ is the shear stress corresponding to the Z-axis direction (the Z-axis is the stress axis and the X-axis is the shear axis), $\varepsilon x$ is a strain corresponding to the normal stress of the X-axis direction, $\varepsilon y$ is a strain corresponding to the normal stress of the Y-axis direction, $\varepsilon z$ is a strain corresponding to the normal stress of the Z-axis direction, $\gamma xy$ is a strain corresponding to the shear stress of the X-axis direction (the X-axis is the stress axis and the Y-axis is the shear axis), $\gamma yz$ is a strain corresponding to the shear stress of the Y-axis direction (the Y-axis is the stress axis and the Z-axis is the shear axis), and $\gamma zx$ is a strain corresponding to the shear stress of the Z-axis direction (the Z-axis is the stress axis and the X-axis is the shear axis), and D is the first elastic modulus matrix. In the embodiment, D is an elastic modulus matrix with a size of 6×6 (shown as an equation (2)), where $\alpha ij$ represents a weight of a stress in an i direction relative to an elastic modulus in a j direction, and the numbers 1, 2, 3, 4, 5, and 6 respectively represent the directions of the normal stresses corresponding to the X, Y, and Z axes, and the directions of the shear stresses corresponding to the X, Y, and Z axes.

$$\begin{bmatrix} \sigma x \\ \sigma y \\ \sigma z \\ \tau xy \\ \tau yz \\ \tau zx \end{bmatrix} = D \begin{bmatrix} \varepsilon x \\ \varepsilon y \\ \varepsilon z \\ \gamma xy \\ \gamma yz \\ \gamma zx \end{bmatrix} \quad \text{equation (1)}$$

In an embodiment, the first elastic modulus matrix D is, for example, a symmetric matrix, shown as the equation (2). Therefore, the storage medium 120 only requires to store diagonal elements of the first elastic modulus matrix D and select each one of the pairs of symmetric elements for storage. For example, the storage medium 120 only requires to store a matrix D' shown in an equation (3). When the first elastic modulus matrix D is required to be used for calculation, the calculation module 122 may use the matrix D' to restore the first elastic modulus matrix D. In this way, a storage space of the storage medium 120 may be saved.

$$D = \begin{bmatrix} a11 & a12 & a13 & a14 & a15 & a16 \\ a12 & a22 & a23 & a24 & a25 & a26 \\ a13 & a23 & a33 & a34 & a35 & a36 \\ a14 & a24 & a34 & a44 & a45 & a46 \\ a15 & a25 & a35 & a45 & a55 & a56 \\ a16 & a26 & a36 & a46 & a56 & a66 \end{bmatrix} \quad \text{equation (2)}$$

$$D' = \begin{bmatrix} a11 & a12 & a13 & a14 & a15 & a16 \\ 0 & a22 & a23 & a24 & a25 & a26 \\ 0 & 0 & a33 & a34 & a35 & a36 \\ 0 & 0 & 0 & a44 & a45 & a46 \\ 0 & 0 & 0 & 0 & a55 & a56 \\ 0 & 0 & 0 & 0 & 0 & a66 \end{bmatrix} \quad \text{equation (3)}$$

Figure 3:
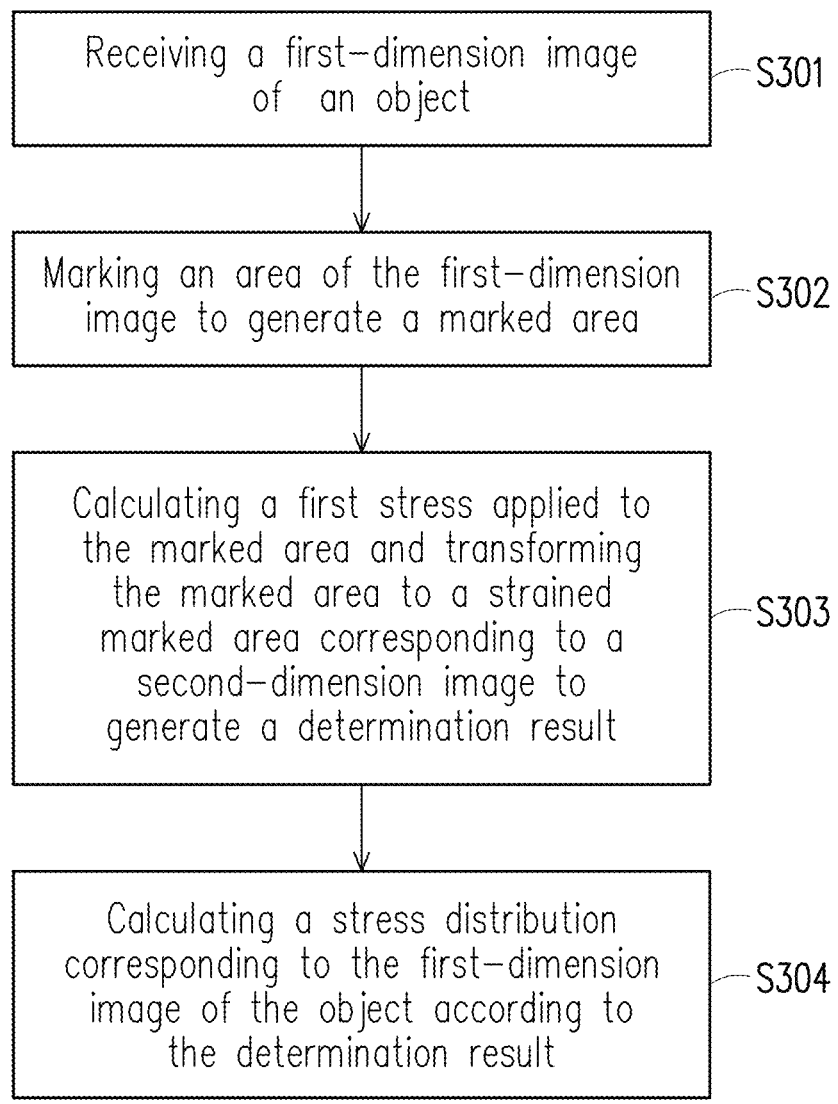
FIG. 3 is a flowchart illustrating a stress measuring method according to an embodiment of the disclosure

FIG. 3 is a flowchart illustrating a stress measuring method according to an embodiment of the disclosure, where the stress measuring method is adapted to measure a stress distribution of an object. The stress measuring method may be implemented by the stress measuring device shown in FIG. 1. In step S301, a first-dimension image of the object is received. In step S302, an area of the first-dimension image is marked to generate a marked area. In step S303, a first stress applied to the marked area and transforming the marked area to a strained marked area corresponding to a second-dimension image is calculated, so as to generate a determination result. In step S304, the stress distribution corresponding to the first-dimension image of the object is calculated according to the determination result.

The stress distribution information generated by the stress measuring device and the stress measuring method of the embodiments of the disclosure may be used for designing related products. For example, different PCB substrates may have different structural features, for example, different substrates may have different slit sizes, slit shapes, slit densities, or substrate aperture ratios, etc. A layout engineer may design parameters such as a line width, a line pitch, a line height, or a density, etc., based on the 2D stress distribution of the PCB. For another example, different fabrics may correspond to different stress distributions. Therefore, a garment factory may design the fabrics according to the stress distribution information generated by the stress measuring device or the stress measuring method of the embodiments of the disclosure.

In summary, the stress measuring device and the stress measuring method of the embodiments of the disclosure are adapted to calculate the stress distribution of the object under different dimensions, so as to provide suitable stress distribution information according to design requirements to design products. By pre-storing the elastic moduli of a plurality of objects, the stress measuring device may quickly calculate a stress distribution of a specific object according to the pre-stored elastic moduli under the condition that the measurement condition of the specific object matches the elastic modulus of the pre-stored object without having to specifically create a 3D model for the specific object.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stress measuring device, adapted to measure a stress distribution of an object, comprising:
   a transceiver, receiving a first-dimension image of the object; and
   a processor, coupled to the transceiver, and configured to:
      mark an area of the first-dimension image to generate a marked area;
      calculate a first stress applied to the marked area and transform the marked area to a strained marked area corresponding to a second-dimension image to generate a determination result, and calculate the stress distribution corresponding to the first-dimension image of the object according to the determination result; and
      transmit the stress distribution via the transceiver.

2. The stress measuring device as claimed in claim 1, wherein the
   processor pre-stores a plurality of elastic moduli respectively corresponding to a plurality of objects.

3. The stress measuring device as claimed in claim 2, wherein the processor measures a strain of the marked area subjected to the first stress and calculates the first stress applied to the marked area according to the strain and a first elastic modulus in the elastic moduli.

4. The stress measuring device as claimed in claim 3, wherein the transceiver receives related data of a second object to calculate the first elastic modulus, wherein the related data comprises a second stress applied to the second object and a strain of the second object subject to the second stress.

5. The stress measuring device as claimed in claim 4, wherein the processor calculates the first stress according to the first elastic modulus in response to a measurement condition matching with the first elastic modulus, wherein the measurement condition corresponds to the object and the first stress, and the first elastic modulus corresponds to the second object.

6. The stress measuring device as claimed in claim 5, wherein the measurement condition is associated with at least one of an object shape, an object material, a stretching direction, a stretching frequency, a stretching speed, a number of times of stretching, a relaxation time, a temperature, a humidity, an air pressure, a gravity, a magnetic field distribution, or an electric field distribution.

7. The stress measuring device as claimed in claim 6, wherein the object material is associated with at least one of:
   a single material or a composite material, a crystalline material or an amorphous material, a molecular average isotropic material or a non-molecular average isotropic material, a material size, or a material shape.

8. The stress measuring device as claimed in claim 3, wherein the first stress comprises at least one of:
   a normal stress in an X-axis direction, a shear stress in the X-axis direction, a normal stress in a Y-axis direction, a shear stress in the Y-axis direction, a normal stress in a Z-axis direction, or a shear stress in the Z-axis direction.

9. The stress measuring device as claimed in claim 8, wherein the first elastic modulus is included in an elastic modulus matrix corresponding to the measurement condition, wherein a row of the elastic modulus matrix corresponds to one of the normal stress in the X-axis direction, the shear stress in the X-axis direction, the normal stress in the Y-axis direction, the shear stress in the Y-axis direction, the normal stress in the Z-axis direction, or the shear stress in the Z-axis direction.

10. The stress measuring device as claimed in claim 9, wherein the elastic modulus matrix is a symmetric matrix.

11. A stress measuring method, adapted to measure a stress distribution of an object, comprising:
   receiving a first-dimension image of the object;
   marking an area of the first-dimension image to generate a marked area;
   calculating a first stress applied to the marked area and transforming the marked area to a strained marked area corresponding to a second-dimension image to generate a determination result;
   calculating the stress distribution corresponding to the first-dimension image of the object according to the determination result; and
   transmitting the stress distribution.

12. The stress measuring method as claimed in claim 11, further comprising:
   pre-storing a plurality of elastic moduli respectively corresponding to a plurality of objects.

13. The stress measuring method as claimed in claim 12, wherein the step of calculating the first stress applied to the marked area and transforming the marked area to the strained marked area corresponding to the second-dimension image to generate the determination result comprises:
   measuring a strain of the marked area subjected to the first stress; and
   calculating the first stress applied to the marked area according to the strain and a first elastic modulus in the elastic moduli.

14. The stress measuring method as claimed in claim 13, further comprising:
   receiving related data of a second object to calculate the first elastic modulus, wherein the related data comprises a second stress applied to the second object and a strain of the second object subject to the second stress.

15. The stress measuring method as claimed in claim 14, wherein the step of calculating the first stress applied to the marked area according to the strain and the first elastic modulus in the elastic moduli comprises:
   calculating the first stress according to the first elastic modulus in response to a measurement condition matching with the first elastic modulus, wherein the measurement condition corresponds to the object and the first stress, and the first elastic modulus corresponds to the second object.

16. The stress measuring method as claimed in claim 15, wherein the measurement condition is associated with at least one of an object shape, an object material, a stretching direction, a stretching frequency, a stretching speed, a number of times of stretching, a relaxation time, a temperature, a humidity, an air pressure, a gravity, a magnetic field distribution, or an electric field distribution.

17. The stress measuring method as claimed in claim 16, wherein the object material is associated with at least one of:
   a single material or a composite material, a crystalline material or an amorphous material, a molecular average isotropic material or a non-molecular average isotropic material, a material size, or a material shape.

18. The stress measuring method as claimed in claim 13, wherein the first stress comprises at least one of:
   a normal stress in an X-axis direction, a shear stress in the X-axis direction, a normal stress in a Y-axis direction, a shear stress in the Y-axis direction, a normal stress in a Z-axis direction, or a shear stress in the Z-axis direction.

19. The stress measuring method as claimed in claim 18, wherein the first elastic modulus is included in an elastic modulus matrix corresponding to the measurement condition, wherein a row of the elastic modulus matrix corresponds to one of the normal stress in the X-axis direction, the shear stress in the X-axis direction, the normal stress in the Y-axis direction, the shear stress in the Y-axis direction, the normal stress in the Z-axis direction, or the shear stress in the Z-axis direction.

20. The stress measuring method as claimed in claim 19, wherein the elastic modulus matrix is a symmetric matrix.

* * * * *